Figure 1:
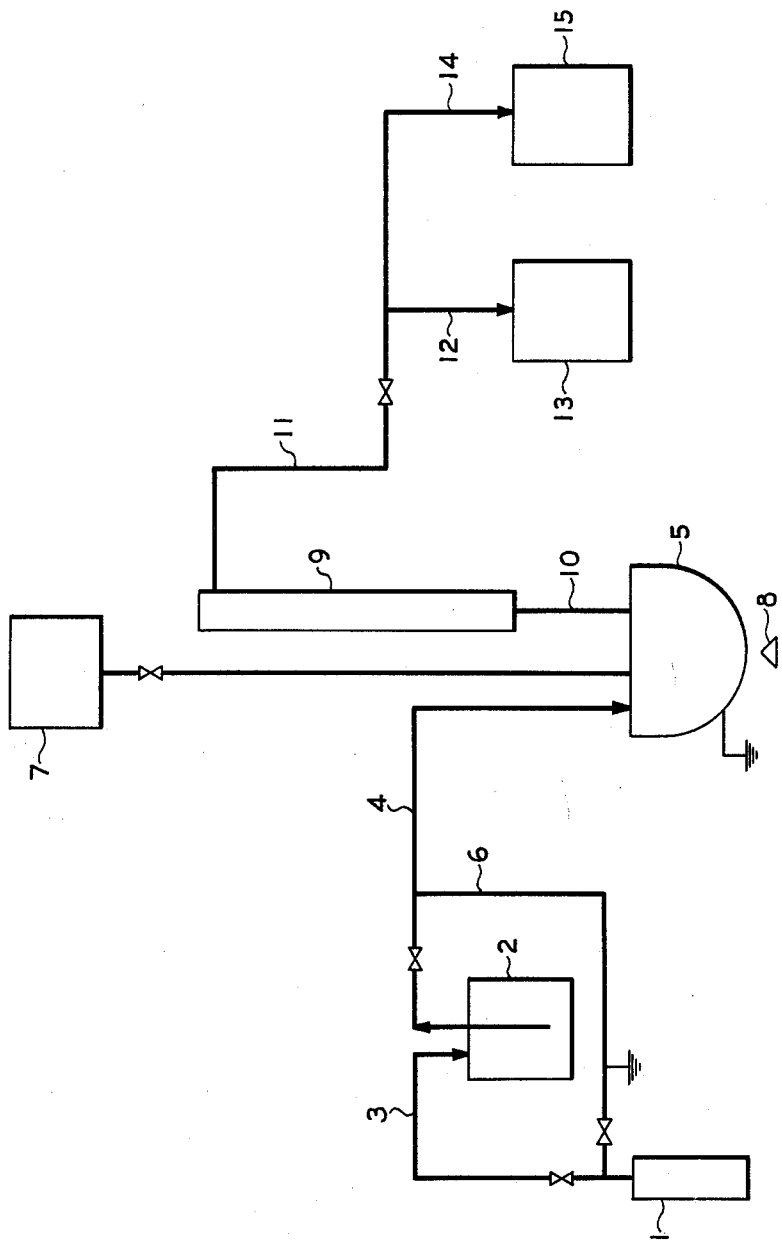

United States Patent Office 3,156,529
Patented Nov. 10, 1964

3,156,529
PROCESS FOR THE PURIFICATION OF THIONYL CHLORIDE
David S. Rosenberg, Niagara Falls, and Harry Flaxman, North Tonawanda, N.Y., assignors to Hooker Chemical Corporation, Niagara Falls, N.Y., a corporation of New York
Filed Oct. 17, 1961, Ser. No. 145,618
13 Claims. (Cl. 23—203)

This invention relates to the production of substantially pure thionyl chloride. More specifically the inventive concept resides in the use of alpha olefins in the production of substantially pure thionyl chloride.

In conventional prior art processes thionyl chloride is produced wherein the final product contains many contaminants, in particular various sulfur chlorides and iron compounds. To minimize the amount of these by-products, a number of purification agents have been utilized, such as monochlorobenzene, toluene and iso-octane. The use of these agents in the production of substantially pure thionyl chloride has been limited commercially because of inherent disadvantages relating to their use. The use of monochlorobenzene leaves much to be desired in the purity of the final thionyl chloride product. Monochlorobenzene is effective in removing only certain minor impurities, giving a colored product still containing the above-mentioned contaminants. Toluene is a more reactive and effective reagent than monochlorobenzene but its use requires extreme precaution and control, since resulting by-products are highly reactive in nature. These by-products have a tendency to polymerize spontaneously to tars, will foam readily, and give off offensive fumes. Also the resulting thionyl chloride product still contains residual contaminating impurities.

Isooctane is relatively ineffective in removing any impurities from crude thionyl chloride.

The process of the present invention provides a method of producing substantially pure thionyl chloride without resulting in highly reactive by-products, while further providing a thionyl chloride product of extremely high purity. While established procedures result in a product containing variable and undesirable amounts of objectionable impurities, the process of this invention results in a final product of uniform and high purity. Since objectionable impurities are kept to a minimum in the present process, the problem of handling offensive materials is substantially eliminated.

The presence of sulfur chloride impurities in the crude thionyl chloride product presents a unique problem in the manufacture of thionyl chloride. The term "sulfur chloride" in this disclosure will refer to both mono- and di-chloride. Also, the term "thionyl chloride" will refer to the crude thionyl chloride unless specified as the pure. Thionyl chloride is used quite extensively in the pharmaceutical industry. The presence of sulfur chloride impurities in thionyl chloride is detrimental to its use in preparing pharmaceuticals, whereas some of the other by-products such as sulfuryl chlorides are not nearly as undesirable. If the thionyl chloride contains any sulfur chloride impurities, many resulting difficulties occur upon use of this thionyl chloride as a chemical intermediate in making other chemicals and pharmaceuticals. For example, when water comes in contact with these sulfur chlorides present in impure thionyl chloride, additional undesirable contaminants are formed, which are extremely difficult to remove from the product. On the other hand, the hydrolysis products formed by contact of water with sulfuryl chloride present in crude thionyl chloride present no such problem.

It was surprisingly found that no obnoxious gas is liberated in the process of this invention when sulfur chlorides are removed from the thionyl chloride. The reaction products formed by the present process are in the form of oily, substantially inert products.

The resulting thionyl chloride product after removal of sulfur chlorides, is a substantially colorless, clear liquid, commercially more valuable than those products containing colored objectionable impurities. The thionyl chloride containing sulfur chlorides usually has a brownish red color when heavily contaminated to a yellowish color when slightly contaminated.

Although it is preferred in the process of this invention to use styrene (with small amounts of sulfur added thereto) other reagent compositions such as olefins, polyolefins or substituted olefins containing at least one hydrogen atom on a double-bonded carbon atom and in which the substituents are not reactive with components present in crude thionyl chloride, may be used. Addition of the reagent may take place at room temperature or at any temperature up to the boiling point of thionyl chloride. As the reagent is added to the crude thionyl chloride, it reacts rapidly with the sulfur compounds present, and, the color of the crude thionyl chloride will be noticeably lightened. The amount of reagent needed is determined by distilling a portion of the thionyl chloride. When all chromophoric sulfur compounds have been reacted, the distillate will be virtually water-white, and distillation of the entire charge can then proceed. Crude thionyl chloride will decompose very slowly at its boiling point to form additional chromophoric sulfur compounds. Continuous addition of a small portion of the reagent throughout the distillation period is therefore advisable to assure complete elimination of these undesirable sulfur chloride impurities from the distilled product.

Styrene monomer is an aromatic colorless mobile liquid. It boils at one hundred and forty-six degrees centigrade and if uninhibited, polymerizes readily by the addition of a catalyst or heat. The preferred reagent is styrene in monomeric form. For storage and handling purposes styrene handled in commerce contains ten to fifteen p.p.m. of p-tert-butyl catechol. Any iron present in the crude intermediate thionyl chloride will accelerate the consumption of the catechol. If the catechol is consumed during the distillation, polymerization takes place and a more viscous residue results. To prevent this from happening, it is preferred that about 0.5 percent sulfur is added to the styrene as an additional inhibitor to maintain the residue as a mobile liquid.

The following examples and disclosure relating to the drawings are intended to define the preferred embodiment of this invention. This invention however is not intended to be limited to the particulars set out in this ensuing discussion. Many modifications will become apparent to one skilled in the art upon a reading of this disclosure; these modifications are intended to be encompassed by this invention.

FIGURE I is a diagrammatic view illustrating a production system of this invention.

Referring to this figure, an inert gas source 1 is positioned in the system whereby to feed a somewhat constant stream of inert gas to styrene tank 2. This source of inert gas provides through feed line 3, a non-reactive atmosphere in the styrene container 2. Styrene tank 2 contains a styrene monomer mix having therein from 0.5 percent to about 6.0 percent sulfur. The sulfur is added to the styrene to prevent any polymerization or formation of tars in the system. The styrene mix may be agitated if desired to insure a constantly homogeneous mixture. Styrene feed line 4 extends from styrene tank 2 to feed pot 5. Inert gas return line 6 allows the nitrogen to be drawn off and refed to nitrogen source 1. Still pot 5 contains therein crude thionyl chloride contaminated with impurities comprising sulfur chlorides and Fe. The crude thionyl chloride is added to still pot 5 from a thionyl chloride source 7. This source may be a collection vessel from a continuous thionyl chloride production system, or may if desired be a collection tank apart from the production system. A source of heat 8 is positioned in contact with still pot 5; the mix contained in pot 5 is gradually heated to reflux temperature (seventy-five degrees to seventy-seven degrees centigrade). A fractionating column 9 is positioned in contact with still pot 5 (or still pot lead 10), on one end portion and liquid reflux lead 11 on the other end portion. A water jacket (not shown in drawing) may optionally be added to the reflux system if desired. Fractionating column 9 has positioned therein a sight glass whereby the color of the refluxed liquid can be observed. As the styrene is continuously fed to the still pot 5, it reacts with the sulfur compounds of the thionyl chloride. Initially the reflux material will be dark red (color caused by impurities therein), and the distillate gradually becomes lighter as the impurities react with the styrene. When the distillate becomes almost colorless or a light straw color, removal of the distillate may begin. Liquid reflux lead 11 transports the distillate from fractionating column 9 to the connecting structures of the system. A small portion of the distillate will contain low boiling impurities which may be removed if desired by collecting separately that portion having a boiling point at atmospheric pressure of less than seventy-nine degrees centigrade. The boiling point of the thionyl chloride is 78.9 degrees centigrade. These impurities are drawn off by foreshot lead line 12 and deposited into a collection vessel 13. After these low boiling impurities are removed, the distillation is continued until all the thionyl chloride is drawn off by lead 14, and collected in thionyl chloride collection vessel 15.

In this purification system a high initial flow rate of styrene is desirable to remove the high concentration of sulfur chlorides and iron compounds present in the untreated crude thionyl chloride. After these contaminants are substantially reacted as indicated by the color of the distillate the styrene addition rate is reduced to a lower rate sufficient to remove remaining sulfur chlorides and iron compounds and also the sulfur chloride impurities formed during the distillation. The distillation residue is passive and fluid. A high yield is obtained of a nearly white product.

The following examples further illustrate the specifics of this invention:

*Example 1*

A still pot fitted with a vacuum jacketed distillation column, was charged with about five hundred grams of crude thionyl chloride containing about eighty-seven to ninety percent thionyl chloride. To this was added at room temperature with agitation about fifty grams of trichloroethylene. The resulting mix was then heated with an electric mantle to about seventy-eight degrees centigrade and distilled. The vapor passed through the jacketed distillation column into a vertical condenser. The purified white thionyl chloride was taken off at a vapor temperature of seventy-five to seventy-seven degrees centigrade. The analysis of this thionyl chloride product was ninety-nine percent.

*Example 2*

A still pot fitted with a vacuum jacketed distillation column was charged with about five hundred grams of crude thionyl chloride containing about eighty-seven to ninety percent thionyl chloride. To this was added at room temperature with agitation about ten grams diisobutylene. The resulting mix was then heated with an electric mantle, to about seventy-eight degrees centigrade and distilled. The vapor passed through the jacketed distillation column into a vertical condenser. The purified white thionyl chloride was taken off at a vapor temperature of seventy-five to seventy-seven degrees centigrade. The analysis of this thionyl chloride product was 99.2 percent.

*Example 3*

A still pot fitted with a vacuum jacketed distillation column was charged with about five hundred grams of crude thionyl chloride containing about eighty-seven to ninety percent thionyl chloride. To this was added at room temperature with agitation about fifteen grams of a straight chain α-olefin in the $C_{12}$ to $C_{20}$ range with approximately forty percent $C_{16}$ and thirty percent $C_{18}$. The resulting mix was then heated with an electric mantle to about seventy-eight degrees centigrade and distilled. The vapor passed through the jacketed distillation column into a vertical condenser. The purified white thionyl chloride was taken off at a vapor temperature of seventy-five to seventy-seven degrees centigrade. The analysis of this thionyl chloride product was 99.5 percent.

*Example 4*

A still pot fitted with a vacuum jacketed distillation column was charged with about five hundred grams of crude thionyl chloride containing about eighty-seven to ninety percent thionyl chloride. To this was added at room temperature with agitation about twelve grams of a straight chain α-olefin $C_6$ to $C_9$. The resulting mix was then heated with an electric mantle to about seventy-eight degrees centigrade and distilled. The vapor passed through the jacketed distillation column into a vertical condenser. The purified white thionyl chloride was taken off at a vapor temperature of seventy-five to seventy-seven degrees centigrade. The analysis of this thionyl chloride product was about 99⊕ percent.

*Example 5*

Eight hundred grams of crude thionyl chloride containing about ninety-five percent thionyl chloride ($SOCl_2$) and about four percent of sulfur chlorides were added to a one thousand milliliter, round bottom flask. A distillation column (three feet high by three-quarter of an inch in diameter filled with one-eighth inch glass beads), and reflux condenser and splitter were attached to the flask so that vapors formed during the reaction could condense and thus be contained in the system. The temperature was measured in the pot liquor and the vapor space on top of the column. The organic reagent (e.g., styrene, trichloroethylene, diisobutylene, α-olefins, etc.) was slowly mixed dropwise with the crude thionyl chloride until it changed in color from red to yellow. At this point a thirty degree centigrade temperature rise in the pot was noted. Additional heat to carry on the distillation was added by using an electrically heated mantle around the flask. The pot temperature was raised to seventy-eight degrees centigrade and the vapor temperature to seventy-six degrees centigrade. The distillate was removed at 4:1 ratio of takeoff to reflux. The distillation proceeded until the vapor temperature at seventy-seven degrees centigrade began to decrease. Samples were analyzed at the beginning, middle, and the end of the takeoff period. The results were as follows:

Using styrene—final product 99.3 percent thionyl chloride.
Using trichloroethylene—final product 99.2 percent thionyl chloride.
Using diisobutylene—final product 99.2 percent thiochloride.
Using α-olefin of $C_{12}C_{20}$—final product 99.5 percent thionyl chloride (molecular weight 215 (average)).
Using α-olefin of $C_6$–$C_9$—final product 99+ percent. (Molecular weight of 102 (average)).

The above examples illustrate the desirable reduction of the sulfur chloride and Fe impurities in thionyl chloride in laboratory procedures.

The following examples indicate further semi-commercial procedures conducted which also clearly illustrates the process of this invention. Various modifications in the conditions or specifics set out in these examples are considered within the scope of this invention.

Example 6

Under the process of the production system described with reference to the figure, a crude thionyl chloride was analyzed to contain 86.0 percent thionyl chloride, 5.5 percent sulfur chlorides, and about 2.4 percent $SO_2$. The final thionyl chloride product analysis showed 98.4 percent, .22 percent sulfur chlorides (mono-, dichlorides), and .44 percent $SO_2$; 1.9 p.p.m. Fe.

Example 7

Under the process of the production system described with reference to the figure, a crude thionyl chloride was analyzed to contain 88.0 percent thionyl chloride, and impurities containing 3.4 percent (of total thionyl chloride mix) sulfur chlorides, and about 1.6 percent (of total thionyl chloride mix) $SO_2$. The final thionyl chloride product analysis showed 95.55 percent, .17 percent sulfur chlorides (di- and monochlorides), and .68 percent $SO_2$.

Example 8

Under the process of the production system described with reference to the figure, a crude thionyl chloride was analyzed to contain 89.0 percent thionyl chloride, and impurities containing 3.8 percent (of total thionyl chloride mix) sulfur chlorides, and about 2.6 percent (of total thionyl chloride mix) $SO_2$. The final thionyl chloride product analysis showed 98.41 percent, .16 percent sulfur chlorides (di- and monochlorides), and .80 percent $SO_2$, and .80 p.p.m. iron.

Example 9

Under the process of the production system described with reference to the figure, a crude thionyl chloride was analyzed to contain 94.0 percent thionyl chloride, and impurities containing 2.4 percent (of total thionyl chloride mix) sulfur chlorides, and about .66 percent (of total thionyl chloride mix) $SO_2$, and 42.9 p.p.m. (parts per million) iron (Fe). The final thionyl chloride product analysis showed 97.41 percent thionyl chloride, .12 percent sulfur chlorides (di- and monochlorides), .77 percent $SO_2$, and 1.7 p.p.m. iron (Fe).

Example 10

Under the process of the production system described with reference to the figure, a crude thionyl chloride was analyzed to contain 86.0 percent thionyl chloride, and impurities containing 3.5 percent (of total thionyl chloride mix) sulfur chlorides, 3.4 percent (of total thionyl chloride mix) $SO_2$, and 100.6 p.p.m. iron (Fe). The final thionyl product analysis showed 97.76 percent thionyl chloride, .17 percent sulfur chlorides (di- and monochlorides), .77 percent $SO_2$, and 0.9 p.p.m. iron (Fe).

Example 11

Under the process of the production system described with reference to the figure, a crude thionyl chloride was analyzed to contain 84.85 percent thionyl chloride, and impurities containing 3.7 percent (of total thionyl chloride mix) sulfur chlorides, about 2.8 percent (of total thionyl chloride mix) $SO_2$, and about 63.2 p.p.m. iron (Fe). The final thionyl chloride product analysis showed 98.64 percent ($SOCl_2$), .15 percent sulfur chlorides (di- and monochlorides), .93 percent $SO_2$, and about 1.5 p.p.m. iron (Fe).

Example 12

Under the process of the production system described with reference to the figure, a crude thionyl chloride, and impurities containing 4.5 percent (of total thionyl chloride mix) sulfur chlorides, about 3.1 percent (of total thionyl chloride mix) $SO_2$, and about forty-three p.p.m. iron (Fe). The final thionyl chloride product analysis showed 98.94 percent, .21 percent sulfur chlorides (di- and trichlorides), .77 percent $SO_2$, and 2.6 p.p.m. iron (Fe).

Example 13

Under the process of the production system described with reference to the figure, a crude thionyl chloride, and impurities containing 3.2 percent (of total thionyl chloride mix) sulfur chlorides, about 2.5 percent (of total thionyl chloride mix) $SO_2$, and about seventy p.p.m. (Fe). The final thionyl chloride product analysis showed 98.89 percent, .18 percent sulfur chlorides (di- and monochlorides), .88 percent $SO_2$, and .7 p.p.m. iron (Fe).

Example 14

Under the process of the production system described with reference to the figure, a crude thionyl chloride, and impurities containing 2.3 percent (of total thionyl chloride mix) sulfur chlorides, about 2.0 percent (of total thionyl chloride mix) $SO_2$. The final thionyl chloride product analysis showed 99.10 percent ($SOCl_2$), .18 percent sulfur chlorides (di- and monochlorides), and .67 percent $SO_2$.

Example 15

Under the process of the production system described with reference to the figure, a crude thionyl chloride, and impurities containing 4.5 percent (of total thionyl chloride mix) sulfur chlorides, about 1.7 percent (of total thionyl chloride mix) $SO_2$. The final thionyl chloride product analysis showed 99.07 ($SOCl_2$) percent, .18 percent sulfur chlorides (di- and monochlorides), and .66 percent $SO_2$.

Example 16

Under the process of the production system described with reference to the figure, a crude thionyl chloride, and impurities containing 1.7 percent (of total thionyl chloride mix) sulfur chlorides, about 1.8 percent (of total thionyl chloride mix) $SO_2$, and 36.2 p.p.m. iron (Fe). The final thionyl chloride product analysis showed 97.84 percent $SOCl_2$, .24 percent sulfur chlorides (di- and monochlorides), 1.04 percent $SO_2$, and about .5 p.p.m. iron (Fe).

Example 17

Under the process of the production system described with reference to the figure, a crude thionyl chloride, and impurities containing 4.9 percent (of total thionyl chloride mix) sulfur chlorides, about 1.8 percent (of total thionyl chloride mix) $SO_2$, and 98.8 p.p.m. of iron (Fe). The final thionyl chloride product analysis showed 98.88 percent $SOCl_2$, .27 percent sulfur chlorides (di- and monochlorides), .72 percent $SO_2$, and about 2.8 p.p.m. iron (Fe).

Example 18

Under the process of the production system described with reference to the figure, a crude thionyl chloride, and impurities containing 6.8 percent (of total thionyl chloride mix) sulfur chlorides, about 1.6 percent (of total thionyl chloride mix) $SO_2$. The final thionyl chloride product analysis showed 99.00 percent $SOCl_2$, .32 percent sulfur chlorides (di- and monochlorides), and .63 percent $SO_2$.

Example 19

Under the process of the production system described with reference to the figure, a crude thionyl chloride, and impurities containing 3.2 percent (of total thionyl chloride mix) sulfur chlorides, about 5.6 percent (of total thionyl chloride mix) $SO_2$. The final thionyl chloride product analysis showed 98.3 percent $SOCl_2$, .7 percent sulfur chlorides (di- and monochlorides), and .9 percent $SO_2$.

Various changes and modifications may be made in the method and in the apparatus of this invention, certain preferred forms of which have been herein described, without departing from the spirit and scope of this invention. These modifications of this basic invention are to be regarded as within the scope and purview of this invention.

We claim:

1. A process for the production of thionyl chloride of high purity from a crude thionyl chloride containing a sulfur chloride impurity which comprises contacting the crude thionyl chloride with an alpha olefin, heating the crude thionyl chloride and alpha olefin until a distillate is obtained, substantially free of the sulfur chloride, distilling off thionyl chloride substantially free of sulfur chloride and condensing said distillate to obtain a purified liquid thionyl chloride.

2. A process according to claim 1, wherein there is present in the mixture of crude thionyl chloride and alpha olefin during heating and distillation thereof a polymerization inhibitor to prevent undesired polymerization of the alpha olefin.

3. A process of claim 2, wherein the polymerization inhibitor is p-tert-butyl catechol.

4. The process of claim 2, wherein the polymerization inhibitor is sulfur.

5. The process of claim 2 wherein the alpha olefin is styrene, iron is present in the distillation mixture and the polymerization inhibitor is a mixture of p-tert-butyl catechol and sulfur, the sulfur aiding in inhibiting polymerization of the alpha olefin which would otherwise occur due to consumption of the p-tert-butyl catechol polymerization inhibitor by reaction with iron in the distillation mixture and the alpha olefin is styrene monomer.

6. The process of claim 1 wherein the alpha olefin is styrene.

7. The process of claim 1 wherein the alpha olefin is trichloroethylene.

8. The process of claim 1 wherein the alpha olefin is diisobutylene.

9. The process of claim 1 wherein the alpha olefin is an aliphatic hydrocarbon of about 6 to 20 carbon atoms.

10. A process for the production of substantially pure thionyl chloride from a thionyl chloride containing sulfur chloride impurities which comprises admixing styrene and crude thionyl chloride, heating the resulting mixture to the boiling point thereof, removing distillate therefrom and condensing it and removing remaining impurities in said condensate by heating said condensate to a temperature below the boiling point of thionyl chloride to distill off said impurities and recovering the undistilled material remaining.

11. A process for reducing the sulfur monochloride and sulfur dichloride content of a crude thionyl chloride which comprises contacting the crude thionyl chloride with styrene and sulfur, heating the resulting mixture to a temperature of about 75 degrees centigrade to 79 degrees centigrade, removing the resulting distillate under reflux, condensing the distillate and removing remaining impurities therein by heating the condensate to a temperature below about 78.9 degrees centigrade, to distill off the remaining impurities, and recovering the substantially pure thionyl chloride remaining.

12. A process according to claim 11 in which a polymerization inhibitor is present with the thionyl chloride and styrene during heating and refluxing, to prevent polymerization of the styrene, whereby the residue left in the reflux vessel is readily removable therefrom.

13. A process for reducing the sulfur monochloride, sulfur dichloride and iron content of a crude thionyl chloride which comprises contacting the crude thionyl chloride containing sulfur monochloride, sulfur dichloride and iron with styrene and sulfur, the sulfur being present in proportion from 0.5 to 6.0 percent of the styrene material and acting to inhibit polymerization of the styrene and decrease the iron content of the crude thionyl chloride, heating the resulting mixture to a temperature of about 75 degrees centigrade to 79 degrees centigrade, refluxing until the distillate drawn off is substantially free of sulfur dichloride and withdrawing the distillate and condensing it to obtain the thionyl chloride of decreased sulfur dichloride and iron content.

References Cited in the file of this patent

UNITED STATES PATENTS

| | | |
|---|---|---|
| 2,529,671 | Bissinger | Nov. 14, 1950 |
| 2,539,679 | Trager | Jan. 30, 1951 |

UNITED STATES PATENT OFFICE
CERTIFICATE OF CORRECTION

Patent No. 3,156,529

November 10, 1964

David S. Rosenberg et al.

It is hereby certified that error appears in the above numbered patent requiring correction and that the said Letters Patent should read as corrected below.

Column 5, line 70, and column 6, lines 5, 15 and 25, after "crude", each occurrence, insert -- thionyl chloride was analyzed to contain 87.0 percent --; column 6, line 34, after "crude" insert -- thionyl chloride was analyzed to contain 90.00 percent --; lines 45 and 55, after "crude", each occurrence, insert -- thionyl chloride was analyzed to contain 88.00 percent --; same column 6, line 65, after "crude" insert -- thionyl chloride was analyzed to contain 84.1 percent --.

Signed and sealed this 27th day of April 1965.

(SEAL)
Attest:

ERNEST W. SWIDER
Attesting Officer

EDWARD J. BRENNER
Commissioner of Patents